United States Patent [19]

Leonard et al.

[11] 3,811,317
[45] May 21, 1974

[54] METHOD FOR TESTING MEMBRANOUS DEVICES FOR LEAKS

[75] Inventors: Ronald J. Leonard, Elk Grove; James M. Ahrens, Niles, both of Ill.

[73] Assignee: Baxter Laboratories, Inc., Morton Grove, Ill.

[22] Filed: Mar. 6, 1972

[21] Appl. No.: 232,062

[52] U.S. Cl............................ 73/40, 73/37.7, 73/41
[51] Int. Cl........................ G01m 3/04, G01m 3/20
[58] Field of Search............. 73/40, 37, 38, 159, 41, 73/37.7; 26/70; 23/230 R, 253 R, 232 R, 254 R

[56] References Cited
UNITED STATES PATENTS
3,254,526   6/1966   Yarbrough............................ 73/40
2,810,836   10/1957  Hutgins.............................. 73/159 X
2,294,511   9/1942   Neiman............................... 73/159 X
1,960,281   5/1934   Schweizer............................ 73/37 X
2,861,451   11/1958  Emmons................................ 73/38
3,371,518   3/1968   Keyes................................. 73/38

Primary Examiner—Richard C. Queisser
Assistant Examiner—D. M. Yasich

[57] ABSTRACT

A method and apparatus for testing transport membranes provides for advancing a membrane and an indicator medium in unison along a test path while applying a detector fluid to the membrane to produce marks on the indicator medium representative of leaks in the membrane.

12 Claims, 7 Drawing Figures

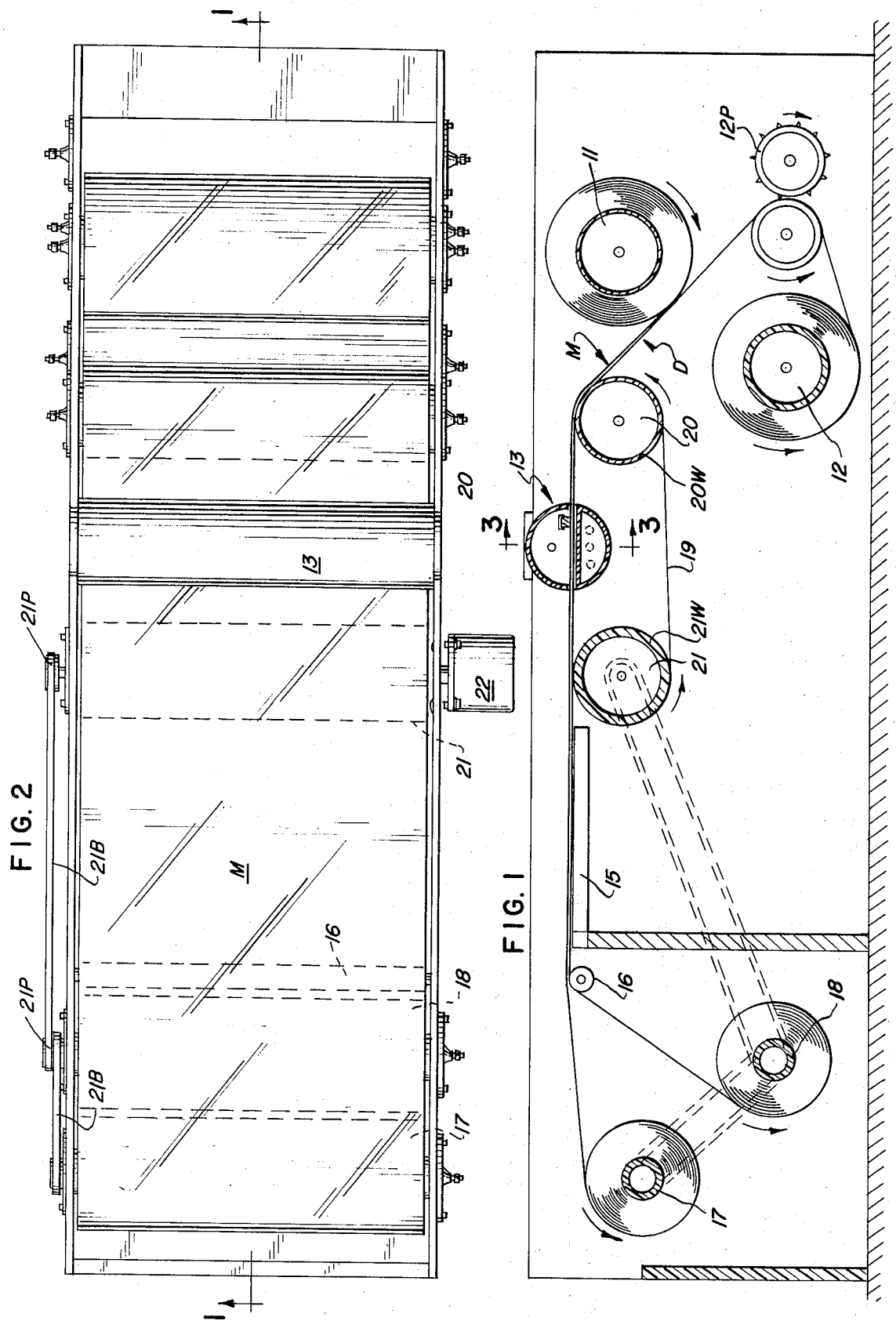

METHOD FOR TESTING MEMBRANOUS DEVICES FOR LEAKS

BACKGROUND OF THE INVENTION

In recent years, many devices employing the transport properties of membranes have been proposed, this being especially true in the field of blood oxygenation. The trend in such devices is towards the use of thinner and thinner membranes because of the better transport properties inherent therein. In the present state of membrane technology, there are manufacturing limitations which make it difficult to achieve extremely thin membranes without the presence of surface discontinuities or pin-holing. While only a few pin holes are encountered in present day membranes, this results in the device being inoperative in that the pin holes allow mixing of the phases which the membrane is intended to separate. Such defects are extremely dangerous in the case of blood oxygenators since the gas phase may pass through the pin holes to enter the blood phase and create a gas emboli which endangers the patient's life.

In most cases, the membrane materials (for example, silicon rubber) are expensive, and the processing of these materials to produce the membranes is expensive and time-consuming. A considerable amount of money is lost in scrap membrane which has holes that render it worthless. Even more money is lost, however, if further processing of the membranes with undetected surface discontinuities is undertaken. The useless final products resulting from membrane defects add to the total product cost.

It is known in the present state of the art to use a membrane masked indicator medium leak technique for testing membranes for pin holes. In accordance with the prior art testing techniques, a membrane is placed over a piece of diazo paper to mask the same and ammonia is passed over the membrane so that where the ammonia leaks through the pin holes the leaks are immediately indicated by exposure of the diazo paper. To insure fast leakage, a vacuum is drawn to pull the membrane against the diazo paper. In the prior art, the ammonia leak test is performed in an isolated chamber where successive membrane sections are processed in a batch-style. This arrangement is useful in finding leaks but it is too time-consuming for use in large scale manufacturing operations. The chamber unit is of a clamping type that must be loaded with sheets of diazo paper and a membrane section placed inside. The unit is then clamped, ammonia is added and, after ammonia is cleared, the clamp is opened.

SUMMARY OF THE INVENTION

In accordance with the present invention, methods and apparatus for testing membranes for pin hole leaks are provided wherein the membrane is supplied from a storage roll to pass in unison with a detector or indicator means through a combined detector fluid applicator and draw-off station, whereat detector fluid passes through any holes in the membrane and changes the state of or exposes the detector means. Where the number of pin holes detected is not too great, the process may be operated continuously while the leak locations can be spotted and marked or repaired. In the case of silicon rubber or silicon copolymer membranes, the repair can be made with an room temperature vulcanizing (RTV) adhesive and covered with a polyethylene patch to prevent sticking.

In one of the described embodiments, the membrane and the detector means, which also is supplied from a storage roll, are stored on separate take-up rolls. The roll-up action on the membrane roll flattens and smooths the repair and, if desired, the polyethylene patch can be removed later. The roll of the diazo paper may be stored as a permanent record or map of the number and distribution of the pin holes.

In the illustrated apparatus arrangement, the test station employs a compartmented distributor head having a vacuum slit through which the membrane and the detector means travel. The presence of the membrane and detector means in the slit divides the head into a detector fluid supply chamber that is bounded by the membrane and a vacuum chamber that is bounded by the detector means. If the detector means is not sufficiently porous, it is made more porous by perforations to allow the vacuum which is drawn to effectively hold down the membrane for ensuring that the detector fluid will be drawn through any pin holes that exist. The testing procedures utilized in the practice of the present invention maintain the pressure differential across the membrane approximately at the value experienced by the membrane in actual service. For example, an oxygenator membrane of silicon rubber is subjected to a vacuum of about 15 inches of Hg.

In the preferred practice of the invention, a travel speed of about ten feet per minute is employed and the membrane is advanced through the vacuum slit in light wiping contact with fluid distributor element, while a flow of sweeping air is maintained across the membrane region immediately downstream of the distributor to preclude the possibility of the detector fluid passing through the membrane due to saturation effects.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a schematic side elevational view of an arrangement for testing a membrane for leaks;

FIG. 2 is a top plan view of FIG. 1;

DESCRIPTION OF PREFERRED EMBODIMENTS

Figure 6:
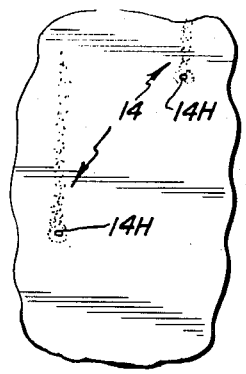
FIG. 6 is a fragmentary plan view of a portion of the indicator paper to show a typical mark produced by a membrane leak.

Referring now to the drawings, a membrane testing arrangement is shown in FIG. 1 wherein the membrane M to be tested is provided in strip form and is supported on a supply roll 11. A detection means is shown in the form of an indicator medium such as diazo paper D for recording or mapping defects in the membrane. The diazo paper D is stored on a supply roll 12 beneath the membrane roll 11. The membrane M and the indicator paper D are shown passing in unison along a test path that leads through a chambered test station 13 where a detector fluid, such as ammonia, is applied directly to the membrane while a vacuum is maintained beneath the indicator paper. The vacuum acts through perforations in the indicator paper provided by the perforator wheel 12P to cause the ammonia to be drawn through any pinholes in the membrane for producing indications on the diazo paper at locations corresponding to the locations of such pinholes. As the membrane and diazo paper move in unison, any pinholes in the membrane remain in register with the indications appearing on the diazo paper to allow immediate repair. Typical indication patterns from pinhole leaks are shown at 14 in FIG. 6, where the head portions 14H constitute the actual locations of the pinholes.

A support shelf 15 extends horizontally down stream of the compartmented test head 13. In the form illustrated herein, the support shelf 15 is one foot in length while the travel speed of the membrane M and paper D is approximately ten feet per minute, so that a time interval of six seconds is allowed for detecting and repairing pinhole leaks as the membrane travels across the support shelf 15. A take-up roller 17 is shown for receiving the membrane and a separate take-up roller 18 is shown for storing the indicator paper. A take-off roller 16 is shown at the down stream edge of the shelf 15 to maintain the take-off point in a common plane.

To facilitate transport of the indicator paper and membrane through the test station, a conveyor including a drive belt 19 in the form of a continuous loop of woven nylon mesh is mounted on guide rollers 20, 21 located fore and aft of the test head 13. The nylon mesh drive belt 19 is powered by means of a motor 22 attached to the aft roller which is also provided with a pully 21P and drive belt 21B connections to drive the takeup rollers 17 and 18 for the membrane and paper strip, respectively. The tension set between the membrane and paper is such that the paper provides substantially all the membrane transporting force.

The illustrated leak testing arrangement is intended particularly for use with membranes that are incorporated in blood oxygenation devices or dialyzers and thus is applicable to the extremely thin silicon rubber membranes, though it is also applicable to silicon copolymers and to cellulose-type membranes. For this application, it is known to utilize ammonia applied to the membrane side of the assembly and diazo paper for detecting the ammonia which leaks through any pinholes that may exist in the membrane.

Figure 3:
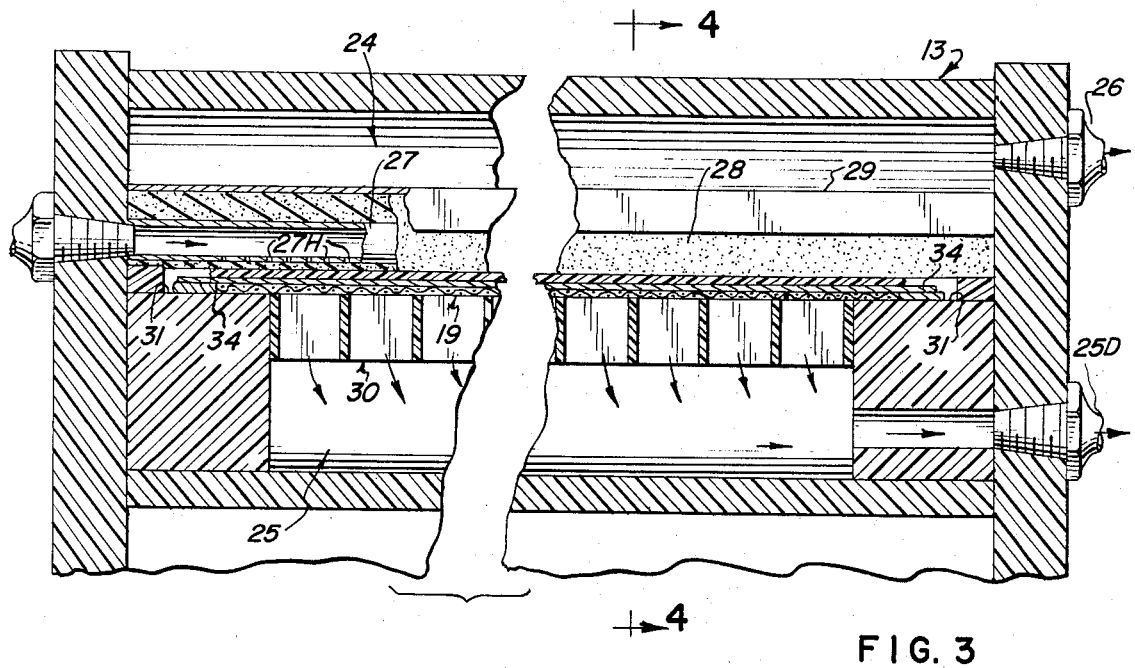
FIG. 3 is an enlarged fragmentary sectional view taken on the line 3—3 of FIG. 1 and illustrating the relationship of the membrane and indicator paper during passage through the vacuum slit of the test station.
Figure 4:
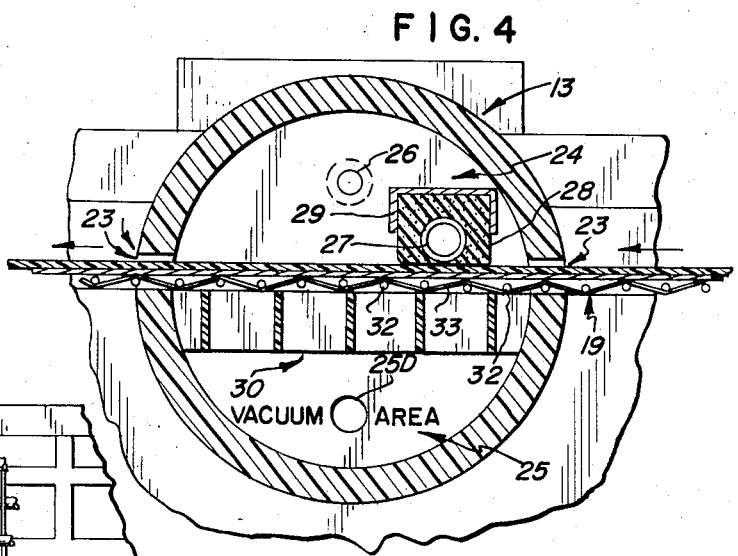
FIG. 4 is a section taken on the line 4—4 of FIG. 3.
Figure 5:
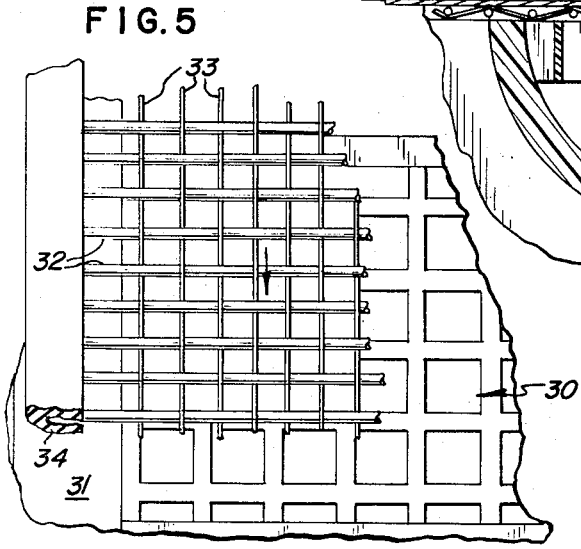
FIG. 5 is a greatly enlarged fragmentary plan view with portions broken away and sectioned to show the structure of a woven mesh employed for supporting and transporting the indicator paper and membrane through the test station.

As best shown in FIGS. 3 and 4, the compartmented test head 13 has a horizontal slit 23 defined between an upper supply chamber 24 where ammonia is applied and a lower vacuum chamber 25. An exhaust stub 26 is shown associated with the supply chamber 24 to produce an air sweeping flow on the down stream extremity of the vacuum slit so that ambient air flows continuously over the membrane surface to sweep it free of any excess ammonia. The continuous air sweeping action is particularly required in the case of silicon rubber membranes for preventing saturation flow through the membrane even where there are no leaks, but is less critical in the case of cellulose-type membranes.

It is important that the ammonia be evenly distributed for uniform application across the entire width of the membrane. For this purpose, the ammonia is supplied through a distributor tube 27 having a uniformly spaced set of holes 27H opening toward the membrane, the tube 27 being located adjacent the upstream extremity of the vacuum slit 23 that divides the test head. The distributor tube 27 is embedded within a foam rubber block 28, the foam being soft enough to accommodate contact without damage to the membrane. The foam block ensures uniform application of the ammonia to the membrane. The foam block 28 is provided with covering walls 29 on its sides, top and ends, and it is positioned to substantially impede entry of air at the up-stream region of the vacuum slit.

The vacuum chamber 25 of the test head 13 includes a vacuum draw-off stub 25D and is equipped with a grillwork 30 spanning substantially the entire width thereof and serving to support the drive belt 19. The belt 19 is shown to be slightly wider than the grillwork 30 and wider than the membrane and the diazo sheet, so that its outer margin rides along support ledges 31 located on the opposite sides of the test head. It will be noted that the nylon mesh drive belt 19 has cross strands 32 of much larger diameter than its lengthwise strands 33 and has its opposite lengthwise margins rubber impregnated to provide tracks 34 for engagement by drive wheels 20W, 21W on opposite ends of the belt guide rollers 20, 21. It will be noted that the impregnated margins or tracks 34 effect a seal against the support ledges within the head. The strand arrangement of the belt 19 described above is such that the large diameter cross strands 32 which cause localized compression in passing beneath the foam block 28 produce a self-sealing action, whereas the belt regions intermediate of the cross strands are comprised only of the small diameter lengthwise strands 31 allow the close clearance positioning of the resilient foam block 28 to maintain an effective vacuum seal at the up-stream extremity of slit 23.

For purposes of disclosure, the typical operating conditions for the disclosed embodiment include the provision of a vacuum of about 15 in. Hg to maintain a pressure differential across the membrane approximately equal to that which is experienced under actual service conditions in a blood oxygenator.

Figure 7:
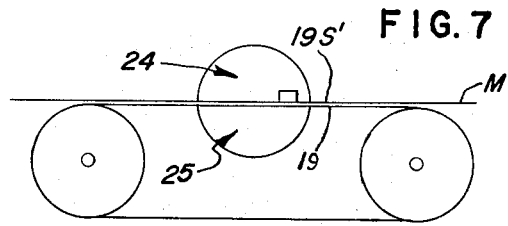
FIG. 7 is a fragmentary view illustrating another embodiment of the invention.

It should be noted that numerous alternative arrangements for carrying out the invention are available. Instead of using diazo paper and ammonia as the mapping media, other combinations can be used which are compatible with the particular membrane being tested. Thus, for example, as shown in FIG. 7, the transport belt 19' has a porous surface 19S' impregnated with a detector means, such as phenolphthalene, that contacts the underface of the membrane strip M due to the action of the partial vacuum in the lower chamber 25.

If ammonia is applied to the upper chamber 24, as previously described, it will be drawn through any pinholes in the membrane strip M to produce temporary pink indications on the impregnated belt. The operator can thus locate such holes and apply a patch while the membrane is travelling across the shelf.

The belt speed and length is such that the temporary indications disappear during the return travel. In this form only the membrane is supplied from a roll so that the equipment is simplified.

It should be noted that other gases or liquids may be distributed to the supply chamber to cooperate with compatible indicators impregnated into the belt.

Thus, while preferred constructional features of the invention are embodied in the structure illustrated herein, it is to be understood that changes and variations may be made by those skilled in the art without departing from the spirit and scope of the appended claims.

What is claimed is:

1. Apparatus for testing an impermeable membrane strip from first supply means for leaks comprising transport means for advancing the strip along a test path that leads through a test station having central slot defining means dividing said station into a pair of gas chambers, one of said chambers being a supply chamber and the other of said chambers being a vacuum chamber, said slot defining means including distributor means in said supply chamber said distributor means having opening means bridging said path test for applying an indicator fluid to successive regions of one face of said strip traversing said distributor means, said transport means including vacuum means for applying a partial vacuum to the vacuum chamber located adjacent the other face of said strip, means for moving a detection means in unison with said strip and adjacent said other face of the strip during travel through said test station to enable the partial vacuum to hold the strip against the detection means and to draw indicator fluid through any holes in said strip to produce an indication of any holes in said strip.

2. Apparatus as defined in claim 1 and wherein said distributor means is disposed adjacent an up-stream test path region of said supply chamber and said test station includes exhaust means communicating with said supply chamber to produce a sweeping flow of incoming air adjacent an downstream test path region of said supply chamber for continuously removing any excess indicator fluid from said strip.

3. Apparatus as defined in claim 1 and wherein said transport means comprises a loop-shaped belt of porous fabric having an upper reach movable along said test path.

4. Apparatus as defined in claim 1 and wherein said distributor means includes a pipe transverse of said path and having holes spaced along its length and a foam rubber block encasing said pipe and presenting a wiping surface for contact with said strip.

5. Apparatus as defined in claim 4 and wherein said transport means comprises a loop-shaped belt of porous fabric and having an upper reach movable along said test path.

6. Apparatus as defined in claim 1 and wherein said detection means comprises a strip of diazo paper movable in unison with said membrane strip to provide a permanent record of the location and number of holes in said membrane strip.

7. Apparatus as defined in claim 1 and wherein said transport means comprises a loop-shaped belt incorporating a detection means therein for providing a temporary indication in response to contact with said indicator fluid.

8. A method for testing an impermeable membrane strip in a compartmented test head that has a pair of gas chambers flanking a central slot for locating leaks due to pin holes in said strip and comprising transporting the strip endwise along a test path leading into, through, and out of the central slot of the test head so that the strip separates said gas chambers, supplying a detector fluid to one of said chambers to apply the fluid to successive regions of one face of said strip during endwise travel of the strip through said head, transporting a detection means into, through and out of the central slot of the head in the same direction as and in unison with said strip and adjacent the other face of said strip, and drawing a vacuum in the other of said chambers to produce a pressure difference between opposite faces of the strip in a sense to cause flow of said fluid through any pin holes in said strip and into contact with said detection means to produce indications thereon of the locations of said pin holes.

9. The method of claim 8 and including the step of maintaining a continuous air flow through said one chamber to contact said successive regions of the membrane strip after application of the fluid thereto for sweeping the strip free of any excess fluid.

10. The method of claim 8 wherein the membrane strip is transported between unwinding and winding membrane strip rolls.

11. The method of claim 10 wherein the detection means is transported between unwinding and winding rolls.

12. The method of claim 8 wherein the pressure difference produced is approximately equal to the pressure difference value to be experienced by the membrane in actual use.

* * * * *